US010763965B2

(12) United States Patent
Ye et al.

(10) Patent No.: US 10,763,965 B2
(45) Date of Patent: Sep. 1, 2020

(54) WIRELESS ACCESS SYSTEM

(71) Applicant: Alcatel Lucent, Nozay (FR)

(72) Inventors: Chenhui Ye, Shanghai (CN); Xiaofeng Hu, Shanghai (CN); Kaibin Zhang, Shanghai (CN)

(73) Assignee: Alcatel Lucent, Nozay (FR)

( * ) Notice: Subject to any disclaimer, the term of this patent is extended or adjusted under 35 U.S.C. 154(b) by 14 days.

(21) Appl. No.: 15/767,228

(22) PCT Filed: Sep. 26, 2016

(86) PCT No.: PCT/IB2016/001551
§ 371 (c)(1),
(2) Date: Dec. 5, 2018

(87) PCT Pub. No.: WO2017/060772
PCT Pub. Date: Apr. 13, 2017

(65) Prior Publication Data
US 2019/0097724 A1 Mar. 28, 2019

(30) Foreign Application Priority Data

Oct. 10, 2015 (CN) .......................... 2015 1 0654528

(51) Int. Cl.
*H04B 10/25* (2013.01)
*H04B 10/2575* (2013.01)
(Continued)

(52) U.S. Cl.
CPC ......... *H04B 10/25753* (2013.01); *H04B 3/32* (2013.01); *H04B 7/024* (2013.01);
(Continued)

(58) Field of Classification Search
CPC .......... H04B 10/25753; H04B 10/2503; H04B 3/32; H04B 7/024
See application file for complete search history.

(56) References Cited

U.S. PATENT DOCUMENTS

2006/0280235 A1* 12/2006 Rhee ..................... H04L 41/142
375/222
2010/0014868 A1* 1/2010 McGlynn ......... H04B 10/25759
398/115
(Continued)

FOREIGN PATENT DOCUMENTS

CN    101166041 A    4/2008
CN    101232345 A    7/2008
(Continued)

OTHER PUBLICATIONS

Gambini J et al: "Radio over telephone lines in femtocell systems", Personal Indoor and Mobile Radio Communications (PIMRC), 2010 IEEE 21ST International Symposium on, IEEE, Piscataway, NJ, USA, Sep. 26, 2010 (Sep. 26, 2010), pp. 1544-1549, XP031838220, ISBN: 978-1-4244-8017-3.
(Continued)

*Primary Examiner* — Dzung D Tran
(74) *Attorney, Agent, or Firm* — Harness, Dickey & Pierce, P.L.C.

(57) ABSTRACT

A wireless access system includes a baseband processing unit pool, an optical network unit and a remote radio head. The BBU pool may be connected to one or more ONUs, each of the ONUs may be connected to one or more RRHs, and the connection between each of the ONUs and the one or more RRHs may be implemented using a twisted pair. Embodiments can provide access, convergence and transport with a very large capacity from indoor antenna units to a centralized BBU as well as an easy installation, and thus they are cost economical for a large scale deployment of indoor wireless access. Furthermore, advanced wireless technologies, such as large scale MIMO and CoMP, can be supported.

9 Claims, 9 Drawing Sheets

(51) Int. Cl.
    *H04W 88/08* (2009.01)
    *H04B 3/32* (2006.01)
    *H04B 7/024* (2017.01)
    *H04L 12/28* (2006.01)

(52) U.S. Cl.
    CPC ... *H04B 10/2503* (2013.01); *H04B 10/25754* (2013.01); *H04L 12/2885* (2013.01); *H04W 88/085* (2013.01)

(56) References Cited

U.S. PATENT DOCUMENTS

| | | | |
|---|---|---|---|
| 2010/0278328 | A1 | 11/2010 | Mahadevan et al. |
| 2010/0310255 | A1 | 12/2010 | Trojer |
| 2013/0044684 | A1* | 2/2013 | Lee ............... H04W 40/06 370/328 |
| 2013/0148972 | A1* | 6/2013 | Kazawa ............. H04B 10/27 398/100 |
| 2014/0300757 | A1* | 10/2014 | Dhaliwal ........... H04N 17/004 348/192 |
| 2014/0314412 | A1* | 10/2014 | Soto ............... H04L 12/2898 398/67 |
| 2015/0055954 | A1* | 2/2015 | Gronvall ........... H04Q 11/0067 398/49 |
| 2015/0349912 | A1* | 12/2015 | Komi ............... H04J 14/025 398/34 |
| 2016/0134353 | A1* | 5/2016 | Lange .............. H04W 56/004 370/345 |
| 2016/0226556 | A1* | 8/2016 | Nuzman ............. H04B 3/32 |
| 2017/0041975 | A1* | 2/2017 | Skarby ............. H04B 17/14 |

FOREIGN PATENT DOCUMENTS

| | | |
|---|---|---|
| CN | 101247574 A | 8/2008 |
| CN | 101860770 A | 10/2010 |
| CN | 203618129 U | 5/2014 |
| CN | 106358321 A | 1/2017 |
| JP | 2014/165614 A | 9/2014 |
| JP | 2015/061248 A | 3/2015 |
| KR | 10-2011-0039480 A | 4/2011 |
| WO | WO-2008/012865 A | 1/2008 |
| WO | WO-2015/002584 A1 | 1/2015 |
| WO | WO-2015/0025884 A1 | 2/2015 |

OTHER PUBLICATIONS

Kurita Daisuke et al: "Field Experiments on Combination of Downlink CoMP and Smart Vertical MIMO in LTE-Advanced", 2015 IEEE 82nd Vehicular Technology Conference (VTC2015-Fall), IEEE, Sep. 6, 2015 (Sep. 6, 2015), pp. 1-5, XP032857124, DOI: 10.1109/VTCFALL.2015.7390951.
Shibata Naotaka et al: "Mobile front-haul employing ethernet-based TDM-PON system for small cells", 2015 Optical Fiber Communications Conference and Exhibition (, OSA, Mar. 22, 2015 (Mar. 22, 2015), pp. 1-3, XP032784947, DOI: 10.1364/OFC.2015.M2J.1.
Japanese Office Action dated Feb. 19, 2019 for Japanese Application No. 2018-518612.
Office Action for corresponding Chinese Application No. 201510654528.5 dated Apr. 24, 2019.
Lawrence Victor B et al. : "Broadband access to the home on copper", Bell Labs Technical Journal, Wiley, CA, US, vol. 1, No. 1 , Jul. 1, 1996, pp. 100-114.
Ericsson: "Connecting the dots: small cells shape up for high-performance indoor radio Connecting the dots: small cells shape up for high-performance indoor radio", Ericsson Review, vol. 91, 2014, Dec. 19, 2014 (Dec. 19, 2014), http://www.ericsson.com/res/thecompany/docs/publications/ericsson_review/2010/Ericsson-Review-2010-2.pdf, pp. 1-10, XP055171270, ISSN: 0014-0171.
International Search Report PCT/ISA/210 for International Application No. PCT/IB2016/001551 dated May 11, 2017.
Office Action for corresponding Chinese Application No. 201510654528.5 dated Feb. 21, 2019.
Korean Office Action dated Aug. 19, 2019 for Korean Application No. 10-2018-7012851.
Japanese Office Action dated Sep. 10, 2019 for Japanese Patent Application No. 2018-518612.
Korean Office Action dated Feb. 25, 2020 for Korean Application No. 10-2018-7012851.
Summons to attend Oral Proceedings dated Jun. 2, 2020 in European Application No. 16794725.8.

* cited by examiner

WIRELESS ACCESS SYSTEM

CROSS-REFERENCE TO RELATED APPLICATIONS

This application is a national phase under 35 U.S.C. § 371 of PCT International Application No. PCT/IB2016/001551 which has an International filing date of Sep. 26, 2016, which claims priority to Chinese Application No. 201510654528.5, filed Oct. 10, 2015, the entire contents of each of which are hereby incorporated by reference.

FIELD

Embodiments of the present disclosure generally relate to wireless communication, and more specifically relate to a wireless access system, a remote radio head, an optical network unit, an optical line terminal, and a baseband processing unit pool.

BACKGROUND

With the technical and business progress in mobile data traffic, people have noticed that over 70% of the wireless services are consumed indoor. Current dominant indoor wireless access schemes are either of distributed antenna system (DAS) or small cell system. However, there are shortcomings in both of these approaches. For DAS, the data streams fed to/from different antennas are the same, making this scheme good for coverage and cost friendly in deployment but restricted in capacity. For indoor small cell system, since Base Band Unit (BBU) is distributed and co-located together with the radio head, it makes the radio heads very complex and costly on the one hand, and makes wireless coordination among radio heads like coordinated multiple-point (CoMP), massive (multiple-input multiple-output) MIMO incompatible on the other hand.

Comparing to the rapid progress and development pace in wireless communication, its corresponding fronthaul/backhaul strategies based on fixed network technology still lag behind, especially in terms of capacity, feasibility and compatibility. In convention, fiber to the home (FTTH) was once regarded to be a large capacity solution of fixed network and can meet the requirements of accommodating wireless access services. However, FTTH turns out to be suboptimal or incapable for in-building deployment where the antenna heads are in scattering distribution across the rooms and floors and the fiber can't reach with ease and cost efficiency. Therefore, indoor coaxial cables have been chosen as the last 100 meter fixed fronthaul link between the FTTH and the indoor antenna heads. The main reason that makes indoor cable a preferred option as the junction between the radio interface and fiber in the range of about 100 meters is mainly based on the fact that within this range well shielded coaxial cable provides a wide and flat spectrum response with acceptable attenuation and robustness.

However, the present available indoor coverage approach, e.g., DAS on the one hand is weak in throughput capacity since the data to each antenna are identical, and MIMO therefore is not compatible in DAS; on the other hand, current DAS is not economical since costly coaxial cables are used.

Therefore, there is an urgent request on finding a reliable and feasible solution for indoor wireless access and transport over fixed network architectures with the following requests to be fully met: cost efficiency on fixed transport networks with large capacity for wireless x-hauling; and good compatibility to MIMO, CoMP or/and other advanced wireless technologies.

There has been rare of good solutions reported yet for BBU centralized indoor wireless access deployment with long reach fronthaul transport over reliable and cost-efficient fixed networks so far.

SUMMARY

In view of the above technical problems existing in the prior art, embodiments of the present disclosure aim to provide a wireless access system, a remote radio head, an optical network unit, an optical line terminal, and a baseband processing unit pool to solve the above and other technical problems in the prior art.

According to a first aspect of the present disclosure, there is provided a wireless access system. The wireless access system may comprise a baseband processing unit (BBU) pool, an optical network unit (ONU) and a remote radio head (RRH), wherein the BBU pool may be connected to one or more ONUs, each of the ONUs may be connected to one or more RRHs, and the connection between each of the ONUs and the one or more RRHs may be implemented using a twisted pair.

In some embodiments, the connection between each of the ONUs and the one or more RRHs may be implemented using a RJ-45 port. In some embodiments, the connection between the BBU pool and the one or more ONUs may be implemented using an optical fiber and passive optical network (PON) architecture.

In some embodiments, the BBU pool may compensate for crosstalk in transmission via the twisted pair.

In some embodiments, the RRH may implement coordinated transmission of one or more antennas. In some embodiments, the coordinated transmission may include multiple-input multiple-output (MIMO) transmission. In some embodiments, the coordinated transmission may include coordinated multiple-point (CoMP) transmission.

In the embodiments that MIMO is used, the BBU pool may compensate for interference in MIMO transmission and crosstalk in transmission via the twisted pair simultaneously.

In some embodiments, the RRHs may separately receive signals from respective ones of a plurality of antennas, separately process the received signals, and separately feed the processed signals to respective ones of twisted pairs that corresponding to the plurality of antennas, so as to transport the signals to the connected ONUs in parallel. In some embodiments, the processing of the received signals by the RRHs may only include down-conversion processing and signal amplifying processing.

In some embodiments, the ONU may receive a signal from the connected RRH via the twisted pair, may process the received signals and may transmit the processed signals to the connected BBU pool via the optical fiber and the PON architecture. In some embodiments, the processing of the received signals by the ONU may include at least one of the following: analog-to-digital conversion, synchronization and alignment, parallel-to-serial conversion, time division multiplexing, digital-to-analog conversion, and electrical-to-optical conversion.

In some embodiments, the wireless access system may further comprise an optical line terminal (OLT) which can be connected between the one or more ONUs and the BBU pool, receive a signal from the one or more ONUs via the optical fiber and the PON architecture, process the received signal, and transport the processed signal to the BBU pool.

In some embodiments, the processing of the received signal by the OLT may include at least one of the following: optical-to-electrical conversion, analog-to-digital conversion, and time division multiplexing.

In some embodiments, the RRH and the ONU can be located inside a building and the twisted pair may include a local area network (LAN) cable and/or a phone line cable. In some embodiments, each of the ONUs may be associated with the whole building or a floor of the building. In some embodiments, the ONU may include a macro-cell ONU.

According to a second aspect of the present disclosure, there is provided a RRH which may comprise: one or more antenna ports configured to receive signals from respective antennas; a down converting unit configured to down convert the signals of the one or more antenna ports; and a twisted pair corresponding to each of the antenna ports configured to transport the converted signals to an output port.

In some embodiments, the output port may include a RJ-45 port. In some embodiments, the down converting unit may include at least one of the following: an amplifier, a mixer, a low pass filter, and an oscillator.

In some embodiments, the RRH can implement coordinated transmission of one or more antennas. In some embodiments, the coordinated transmission may include MIMO transmission or CoMP transmission.

According to a third aspect of the present disclosure, there is provided an ONU which may comprise: an input port configured to receive a signal via a twisted pair; a processing unit configured to process the received signals; and an output port configured to output the processed signal to an optical fiber and PON architecture for transportation.

In some embodiments, the output port may include a RJ-45 port. In some embodiments, the processing unit may include at least one of the following: an analog-to-digital converting unit, a synchronizing and aligning unit, a parallel-to-serial converting unit, a time division multiplexing unit, a digital-to-analog converting unit, and an electrical-to-optical converting unit.

According to a fourth aspect of the present disclosure, there is provided an OLT which may comprise: an input port configured to receive an optical signal via an optical fiber and PON architecture, wherein the optical signals are generated based on a signal transported through a twisted pair; a processing unit configured to process the received optical signal to be an electrical signal; and an output port configured to output the electrical signal. In some embodiments, the processing unit may include at least one of the following: an optical-to-electrical converting unit, an analog-to-digital converting unit, and a synchronizing and time division multiplexing unit.

According to a fifth aspect of the present disclosure, there is provided a BBU pool which may comprise: a compensating unit configured to compensate for crosstalk of a signal during transportation through a twisted pair. In some embodiments, the compensating unit may be further configured to compensate for crosstalk of the signal during transportation through the twisted pair and interference during MIMO transmission simultaneously.

According to a sixth aspect of the present disclosure, there is provided a wireless access system which may comprise the RRH according to the second aspect, the ONU according to the third aspect, the OLT according to the fourth aspect, or the BBU pool according to the fifth aspect.

As stated above, indoor wireless services are growing dramatically; however there has been no practical solution yet that can support large scale indoor wireless access deployment and be cost effective in terms of installation, wireless coverage and capacity simultaneously. The proposed indoor wireless access solution in the embodiments of the present disclosure can provide access, convergence and transport with a very large capacity from indoor antenna units to a centralized BBU pool.

More importantly, since the embodiments of the present disclosure utilize economical twisted pairs in most buildings as the last 100 meter access media, the installation difficulties are greatly reduced and therefore it is cost economical for large scale deployment of indoor wireless access. Also, advanced value-added services like massive-MIMO and CoMP can be supported.

Furthermore, a unified crosstalk mitigation algorithm is centrally utilized in the BBU, based on which, the overall crosstalk effects induced from both the wireless MIMO channel and crosstalk-rich Cat 5a/6a lines can be effectively eliminated. Diversity and/or multiplexing gain from MIMO can therefore be achieved to fundamentally improve the capacity performance of indoor wireless services, and thus the proposed solutions can be a very good upgrade candidate of current DAS system with sustaining low cost. Moreover, the embodiments of the present disclosure can potentially be used for universal access applications, especially for indoor space where in-building twisted pairs will be adopted as the last 100 meter access and convergence media.

On the other hand, there are no solutions of indoor wireless access which are compatible to BBU centralization, MIMO, CoMP and other advanced wireless applications. There are several solutions which were originally dedicated for macro cells, but they cannot be smoothly introduced for indoor application and deployment, especially for the sake of cost. The embodiments of the present disclosure can fundamentally resolve the cost problem since they fully utilize the economical material of twisted pairs. Furthermore, the convergence and transport capacity for long distance between the antenna units and the centralized BBU pool is large. Therefore, the overall cost can be shared by large amount of ONUs and in-building antenna units.

Advantages of the embodiments of the present disclosure include: firstly, they realize performance gain on BBU centralized in-building small cell deployment. BBU resources can be centralized, MIMO/CoMP may be compatible (compared to the conventional DAS), large convergence capacity in ONU and large transport capacity in optical fiber can be realized, and coordination (and other SDN functions) between radio heads can be supported. Secondly, cost efficiency in installation and deployment of indoor antenna units is improved. The structure of the radio head is neat only with the up/down conversion function and its installation is simple since without BBU, twisted pairs as the last 100 meter access are economical and widely available, and tree-like PON can serve multiple ONUs over multiple floors even multiple buildings. Thirdly, DSP sharing on inter-copper crosstalk mitigation algorithm is realized. Transport procedurals over wireless MIMO and crosstalk rich twisted pair can be channelized and processed in a unified DSP model. Fiber link channelization and hardware/software compensation can be shared and centralized in BBU side as well.

BRIEF DESCRIPTION OF THE DRAWINGS

The above and other objectives, features and advantages of embodiments of the present disclosure will become more apparent in conjunction with the accompanying drawings with reference to the following detailed depiction, and several embodiments of the present disclosure are illustrated here in an example, but non-limitative, manner, in the accompanying drawings, wherein.

DETAILED DESCRIPTION

Principles and spirits of the present disclosure will now be described with reference to several example embodiments illustrated in the drawings. It should be appreciated that depiction of these embodiments is only to enable those skilled in the art to better understand and further implement the present disclosure, not intended for limiting the scope of the present disclosure in any manner.

As described in the previous context, for current indoor DAS system, coaxial cables are in wide use as the last 100 meter fixed tunnel connecting the numerous antenna units to the common baseband processing unit (BBU) pool. Drawbacks in two aspects have been noticed restricting the development of indoor DAS.

Firstly, using coaxial cable is regarded as cost-inefficient since the price of coaxial cable itself is high and the number to be required in future indoor wireless deployment scenarios will be very large. Secondly, data streams fed to/from all the antennas are of broadcasting feature due to the passive cloning mechanism in the fixed cable distribution system. Thus, this restricts the capacity through air interfaces and also disables advanced applications like MIMO and CoMP. Hence, the user experience and the development of indoor wireless business are severely restricted.

Due to the requirement on MIMO-compatibility and compatibility of other advanced wireless technologies and scattering distribution feature of the in-building antenna system, embodiments of the present disclosure propose a wireless access and transport solution over fixed network architectures.

Figure 1:
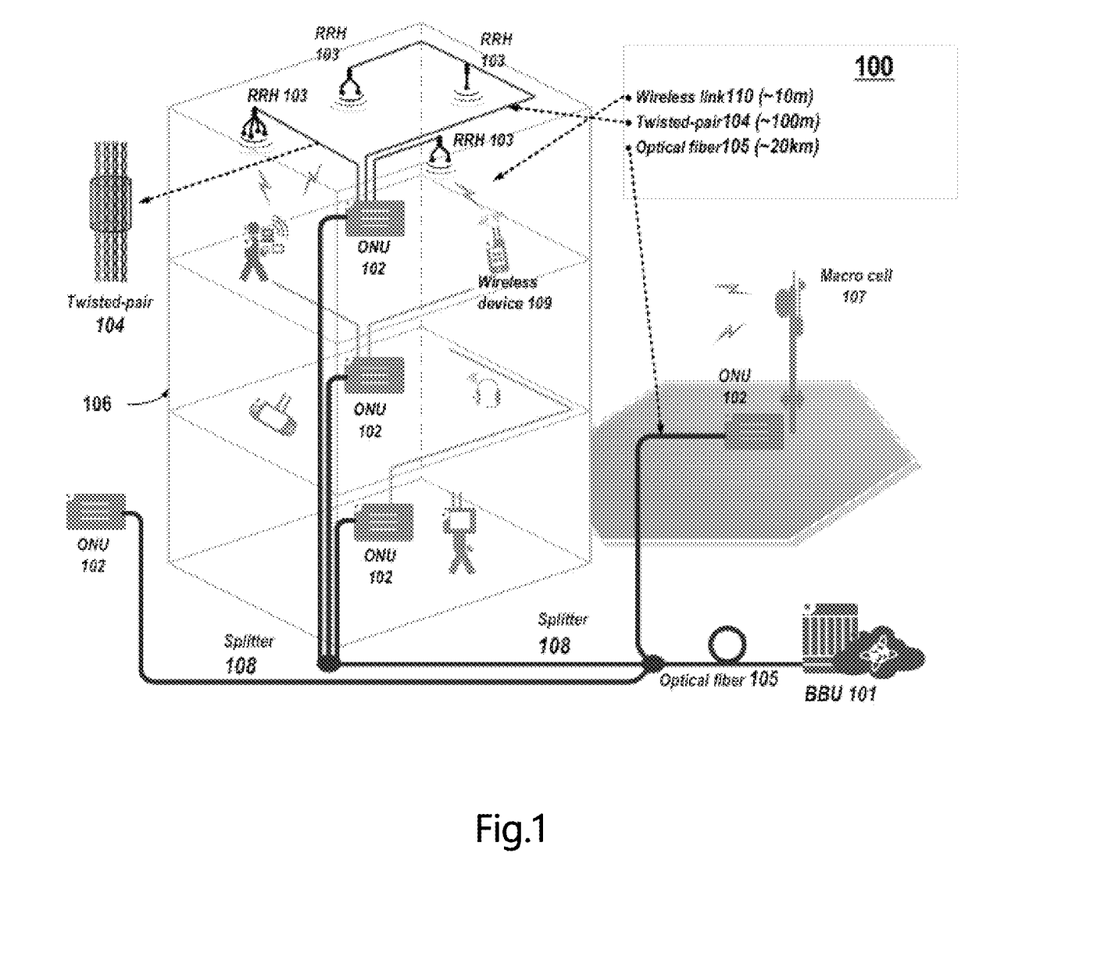
FIG. 1 illustrates an overview diagram of a wireless access system according to embodiments of the present disclosure.

FIG. 1 illustrates an overview diagram of a wireless access system 100 according to the embodiments of the present disclosure. As shown in FIG. 1, the wireless access system 100 may include a baseband processing unit (BBU) pool 101, an optical network unit (ONU) 102 and a remote radio head (RRH) 103. As further shown in FIG. 1, the BBU 101 can be connected to one or more ONUs 102, each ONU 102 can be connected to one or more RRHs 103 and the connection between each ONU 102 and the one or more RRHs 103 can be implemented with a twisted pair 104. In some embodiments, the connection between the BBU 101 and the one or more ONUs 102 can be implemented with an optical fiber 105 and passive optical network (PON) architecture. In PON architecture, the optical fiber 105 can be split into a plurality of optical fiber lines via a splitter 108. Moreover, the RRH 103 can communicate with a wireless device 109 via a wireless link 110. In a specific deployment, the wireless link 110 may typically have a range of 10 meters, the twisted pair 104 may typically have a range of 100 meters, and the optical fiber 105 may typically have a range of 20 km.

As further shown in FIG. 1, in some embodiments, the RRH 103 and the ONU 102 can be located within a building 106 and the twisted pair 104 may include a local area network (LAN) cable and/or a phone line cable. In the embodiment shown in FIG. 1, each ONU 102 may correspond to a floor of the building 106. In such embodiments, the ONU 102 of each floor may be connected with all the RRHs 103 in the same floor via the twisted pair 104. In other embodiments than that shown in FIG. 1, each ONU 102 may correspond to one building.

A converged indoor small cell system and outdoor macro cell access can also be supported by the wireless access system 100 proposed in the embodiments of the present disclosure, where an ONU of the macro cell can also been included in the same PON architecture. Hence, as shown in FIG. 1, in some embodiments, the ONU 102 may include an ONU of a macro cell 107.

As shown in FIG. 1, the wireless access system 100 may include two-order tree-like architecture. One order may connect the BBU 101 with the ONU 102 in optical domain, and a second order may connect the ONU 102 with multiple RRHs 103 (e.g., indoor) in fixed electrical domain. In some embodiments of the present disclosure, fixed network architecture may adopt available LAN cables and/or phone lines (e.g. Cat 5a/6a lines) for transport of the last 100 meter indoor and may adopt the optical fiber 105 with low loss and the PON for the last 20 km transport. During uplink transport, RF signals obtained by each RRH 103 through an antenna are firstly down converted to IF band and transported over a twisted pair in analog IF format. After being multiplexed into one converged stream, the broadband analog signals may be then transported over the optical fiber 105 and the PON to the centralized BBU 101 where post decoding processing may be performed.

Figure 2:
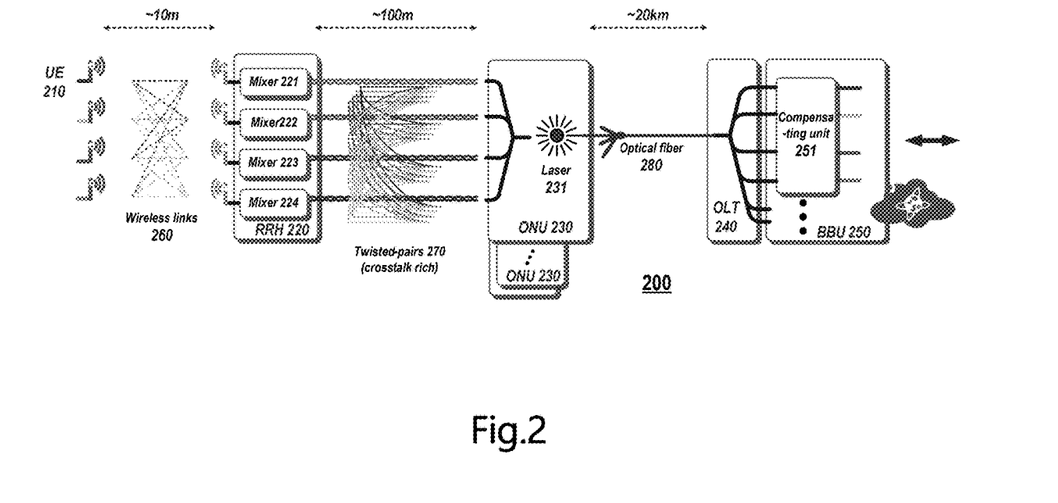
FIG. 2 illustrates a schematic diagram of a wireless access and transport process from user equipment to baseband processing unit pool (BBU) via a wireless link, a twisted pair, and an optical fiber according to embodiments of the present disclosure.

FIG. 2 illustrates a schematic diagram of a wireless access and transport process 200 from user equipment (UE) 210 to a BBU pool 250 via a wireless link 260, a twisted pair 270, and an optical fiber 280 according to embodiments of the present disclosure. By way of example, FIG. 2 further illustrates a RRH 220, an ONU 230 and an OLT 240.

According to some embodiments of the present disclosure, UE 210 can communicate with the RRH 220 via the wireless link 260. In further embodiments, RRH 220 can implement coordinated transmission of one or more antennas. For example, FIG. 2 schematically illustrates four antennas. In some embodiments, the coordinated transmission may include multiple-input multiple-output (MIMO) transmission. In some other embodiments, the coordinated transmission may also include coordinated multiple-points (CoMP) transmission. In some embodiments of indoor scenarios, the wireless link 260 may have a communication range of ten meters or tens of meters.

In some embodiments of the present disclosure, the RRH 220 can convert signals received from antennas into an intermediate frequency via a same number of mixers 221-224 with that of the antennas and may transport them to the ONU 230 over the twisted pair 270. In some embodiments, the twisted pair 270 may include LAN cables and/or phone line cables. In specific scenarios, the twisted pair 270 may have a range of a magnitude order of 100 meters and may contain crosstalk.

According to some embodiments of the present disclosure, the ONU 230 can modulate the received signals onto a laser generated by a laser 231 and transport it to the OLT 240 through the PON including the optical fiber 280. In specific scenarios, the optical fiber 280 in the PON may have a range of a magnitude order of 20 km. The OLT 240 can process the signals received from the optical fiber 280 and transport them to the BBU 250.

Therefore, the obtained signals in the BBU 250 from the UE 210 have gone through not only the wireless link 260 but also the twisted pair 270. In some embodiments, the BBU 250 can compensate for crosstalk during transmission over the twisted pair 270. Further, in the embodiment of the wireless link 260 using wireless MIMO, the BBU 250 may compensate for interference in the MIMO transmission and the crosstalk in the transmission over the twisted pair simultaneously. In some embodiments, the BBU 250 may include a compensating unit 251 which can decode and restore data in the BBU 250 with a unified MIMO/crosstalk eliminating algorithm.

Moreover, it is noteworthy that since in the embodiments of the present disclosure data transported over the twisted pair 270 and the optical fiber 280 are both in an analog format, the signal transmission bandwidth is greatly reduced compared to a digital IQ quantization approach, so that the transport capacity can satisfy the requirement of the technical solution according to the embodiments of the present disclosure. Therefore, using the technical solution provided by the embodiments of the present disclosure for indoor wireless access and transport, a large capacity can be realized on the one hand, and compatibility to MIMO, CoMP and other advanced wireless technologies can be achieved on the other hand in terms of feasibility and cost efficiency.

Figure 3:
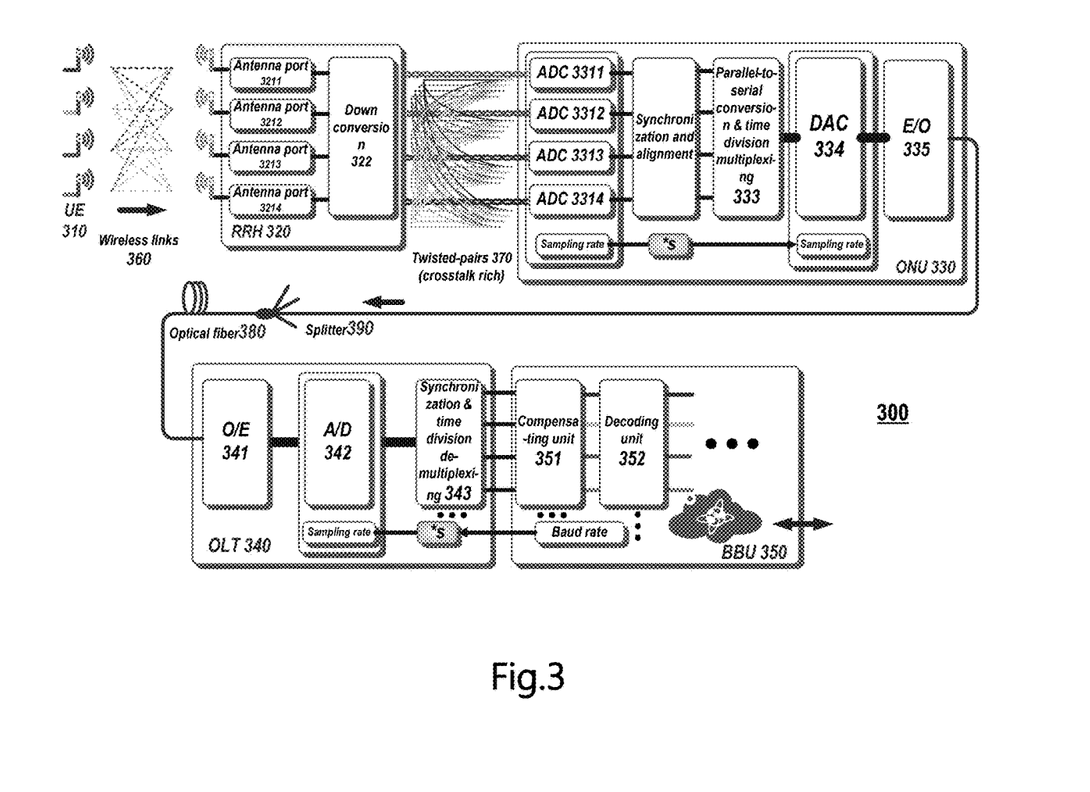
FIG. 3 illustrates a system-level block diagram of the wireless access system according to embodiments of the present disclosure.

FIG. 3 illustrates a system-level block diagram of a wireless access system 300 according to embodiments of the present disclosure. As shown in FIG. 3, the example wireless access system 300 may include four modules and three transport links. The four modules can be a RRH module 320, an ONU module 330, an OLT module 340 and a BBU module 350. The three transport links can be a wireless link 360, twisted pairs 370 and an optical fiber 380. In some embodiments, the optical fiber 380 can be split into multiple optical fiber lines by a splitter 390. In specific scenarios, the twisted pairs 370 may include crosstalk.

During uplink transport, a UE 310 can communicate with the RRH module 320 via the wireless link 360. In some embodiments, the wireless link 360 can be a wireless MIMO channel. The RRH module 320 can transport signals via the twisted pairs 370 to the ONU module 330. In some embodiments, the twisted pairs 370 can be LAN cables and/or phone line cables. In some embodiments, each ONU module 330 can be connected with one or more RRHs 320 via a RJ-45 port. ONU module 330 can transport signals via the optical fiber 380 and a PON architecture to the OLT module 340. In specific scenarios, the length of the optical fiber 380 can be as long as tens of kilometers or more. Finally, the OLT module 340 can transport signals to the BBU unit 350 for centralized baseband processing, thus completing the uplink transporting process. Downlink transporting process can be an inverse process of the uplink transporting process, and thus omitted here.

As further shown in FIG. 3, the RRH module 320 may include antenna ports 3211-3214. Though FIG. 3 specifically illustrates four antenna ports connected respectively to four antennas, those skilled in the art can understand that the RRH module 301 may also include more or less antenna ports. The present disclosure is not limited in this regard. Besides, in some embodiments, the RRH module 320 may further include a down converting unit 322 which can amplify and down convert signals. Each RRH module 320 can separately receive signals from multiple antennas, separately process the received signals and separately feed the processed signals to the twisted pairs 370 corresponding one by one to the multiple antennas, in order to transport them to the connected ONU module 330 in parallel. In some embodiments, processing of the signals received by the RRH module 320 may only include down-conversion processing and signal amplifying processing.

In some embodiments, the ONU module 330 may include analog-to-digital converting (ADC) units 3311-3314. Though FIG. 3 specifically illustrates four ADC units, those skilled in the art can understand that the ONU module 320 may include more or less ADC units. The present disclosure is not limited in this regard. The ONU module 330 may further include one or more of the following units: a synchronizing and aligning unit 332, a parallel-to-serial converting and time division multiplexing unit 333, a digital-to-analog converting (DAC) unit 334, and an electrical-to-optical converting E/O unit 335. Those skilled in the art can understand that these modules can also be divided or combined to form more or less modules, and the present disclosure is not limited in this regard.

During signal transporting, the ONU module 330 can receive signals from the connected RRH module 320 via the twisted pairs 370, process the received signals, and transport the processed signals to the connected BBU module 350 via the optical fiber 380 and PON architecture. In some embodiments, the processing of the received signals by the ONU module 330 may include one or more of the following: analog-to-digital conversion, synchronization and alignment, parallel-to-serial conversion, time division multiplexing, digital-to-analog conversion, and electrical-to-optical conversion.

In some embodiments, the OLT module 340 may include optical-to-electrical converting O/E unit 341, analog-digital converting A/D unit 342, and synchronizing and time division multiplexing unit 343. The BBU module 304 may include a compensating unit 351 and a decoding unit 352. In some embodiments, the OLT module 340 may receive signals from one or more ONU modules 330 via an optical fiber 380, process the received signals, and transport the processed signals to the BBU module 350. In some embodiments, the processing of the received signals by the OLT module 340 may include at least one of the following: optical-to-electrical conversion, analog-to-digital conversion and time division multiplexing.

Those skilled in the art can understand that FIG. 3 does not describe all the constituting units of the RRH module 301, the ONU module 302, the OLT module 303 and the BBU module 304, but only depicts constituting units associated with embodiments of the present disclosure. In a practical deployment, these modules can further include other units to realize their functions. The constituting units of these modules will be explained and illustrated further with reference to FIGS. 4-8 in the following.

Figure 4:
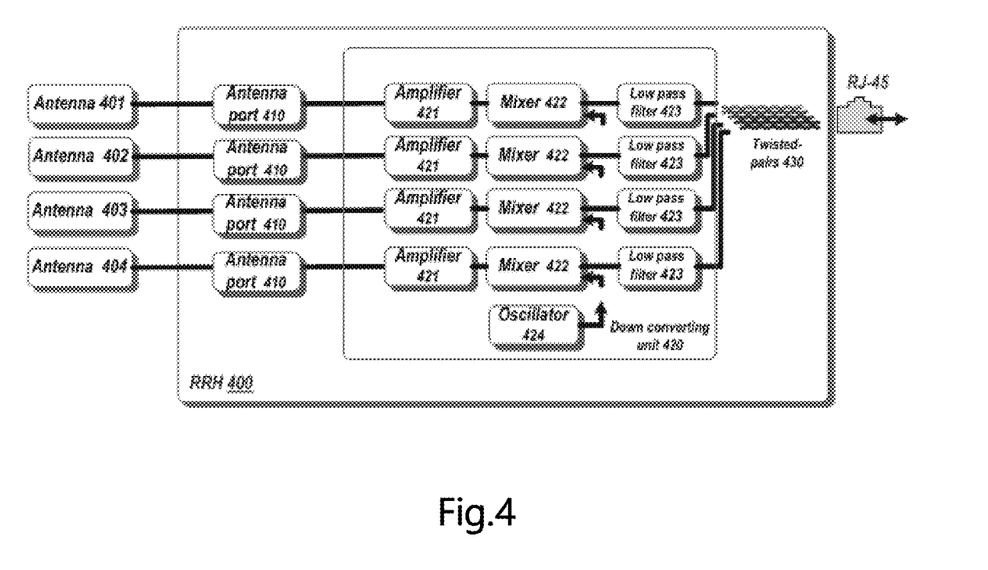
FIG. 4 illustrates a schematic block diagram of a remote radio head (RRH) according to an embodiment of the present disclosure.

FIG. 4 illustrates a schematic block diagram of a RRH 400 according to an embodiment of the present disclosure. As shown in FIG. 4, the RRH 400 may include one or more antenna ports 410, a down converting unit 420 and twisted pairs 430. In some embodiments, the one or more antenna ports 410 can be configured to receive signals from corresponding antennas 401-404. The down converting unit 420 can be configured to amplify and down convert signals from the one or more antenna ports 410. The twisted pairs 430 may correspond to each antenna port 410 and is configured to transport the down converted signals to an output port. In some embodiments, the output port may include a RJ-45 port.

As further illustrated in FIG. 4, in some embodiments, the down converting unit 420 may include one or more of the following units: an amplifier 421, a mixer 422, a low pass filter 423, and an oscillator 424. The specific working principle and operation process of these units in the down converting unit 420 are well known to those skilled in the art, and thus omitted here.

Specifically, in operation, wireless signals received by the RRH 400 from each antenna 401-404 are firstly received by the antenna port 410, and amplified and down converted by the down converting unit 420. The down converted signals can be in a bandwidth from DC to, for instance, 20 MHz. Finally, each down converted output signal can be linked to a twisted pair in e.g. Cat 5a/6a lines.

As shown in FIG. 4, for the embodiment of the RRH 400 connecting with four antennas 401-404, the down converting unit 420 may include four individual down converting sub-modules. The outputs of the four down converting sub-modules can be individually connected to four twisted pairs 430. In some embodiments, these down converting sub-modules may share the oscillator 424.

Figure 5:
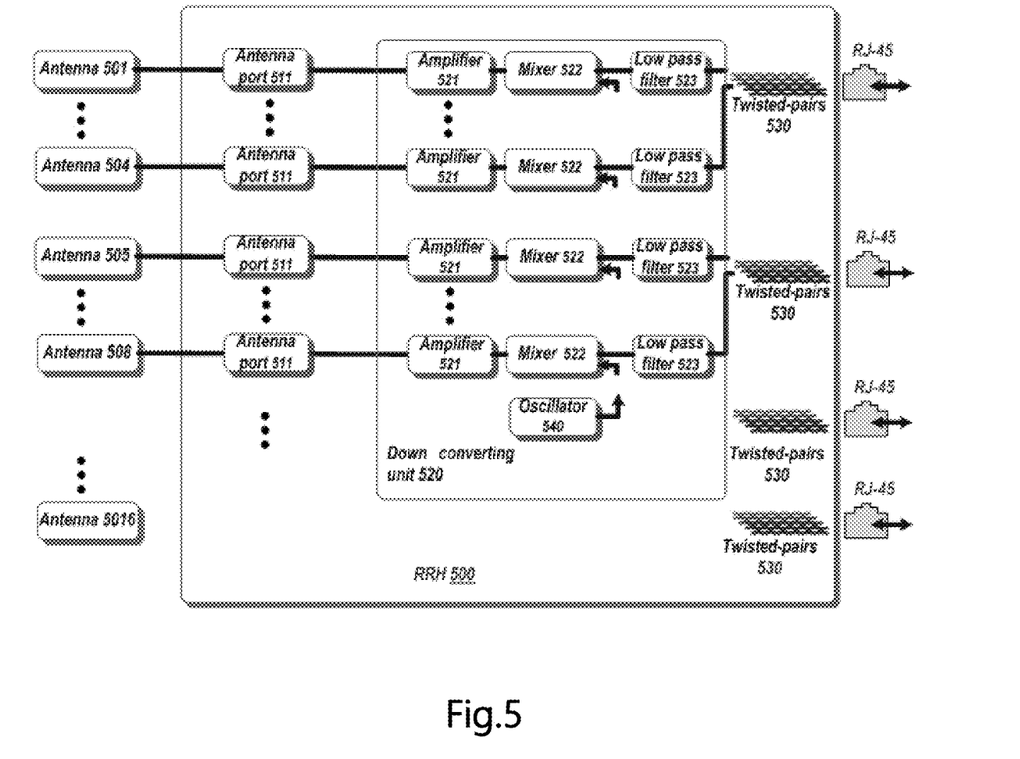
FIG. 5 illustrates a schematic block diagram of a RRH according to another embodiment of the present disclosure.

FIG. 5 illustrates a schematic block diagram of an RRH 500 according to another embodiment of the present disclosure. As shown in FIG. 5, in case that the RRH 500 is connected with more antennas 501-5016, a corresponding number of more antenna ports 511 can be used, a down converting unit 520 can include more down converting sub-modules, and multiple Cat 5a/6a lines can be used as twisted pairs 530. In some embodiments, these down converting sub-modules may share an oscillator 540. As illustrated in FIG. 5, the down converting unit 520 may also include at least one of an amplifier 521, a mixer 522, a low pass filter 523 and the oscillator 540.

In some embodiments, the RRH 400 and the RRH 500 can implement coordinated transmission of one or more antennas 401-404 and antennas 501-5016. In some embodiments, the coordinated transmission may include MIMO transmission or CoMP transmission.

Figure 6:
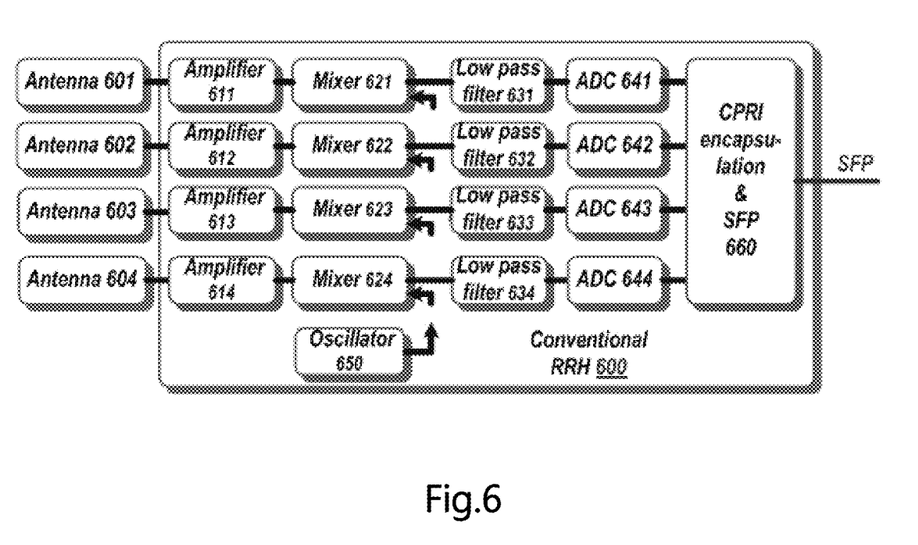
FIG. 6 illustrates a schematic block diagram of a conventional RRH.

In contrast, FIG. 6 illustrates a schematic block diagram of a conventional RRH 600. As shown in FIG. 6, a conventional RRH 600 may include an amplifier 611, mixers 621-624, low pass filters 631-634, and an oscillator 650. Moreover, it also includes ADC units 641-644, a common public radio interface (CPRI) encapsulation and small pluggable interface (SFP) unit 660.

In the conventional RRH 600, the CPRI encapsulation and SFP unit 660 are mainly used to enable output signals fit for transport via an optical fiber. In contrast, since embodiments of the present disclosure can adopt a twisted pair to transport output signals of the RRH. Thus, compared with the conventional RRH 600, the RHH 400 and the RHH 500 according to the embodiments of the present disclosure can remove the ADC units 641-644 and the CPRI encapsulation and SFP unit 660, i.e. a unit used to implement an electrical-to-optical conversion. Moreover, the optical interface (such as SFP) adapted to transport via an optical fiber can be changed to a RJ-45 port fit for transmission via a twisted pair.

Figure 7:
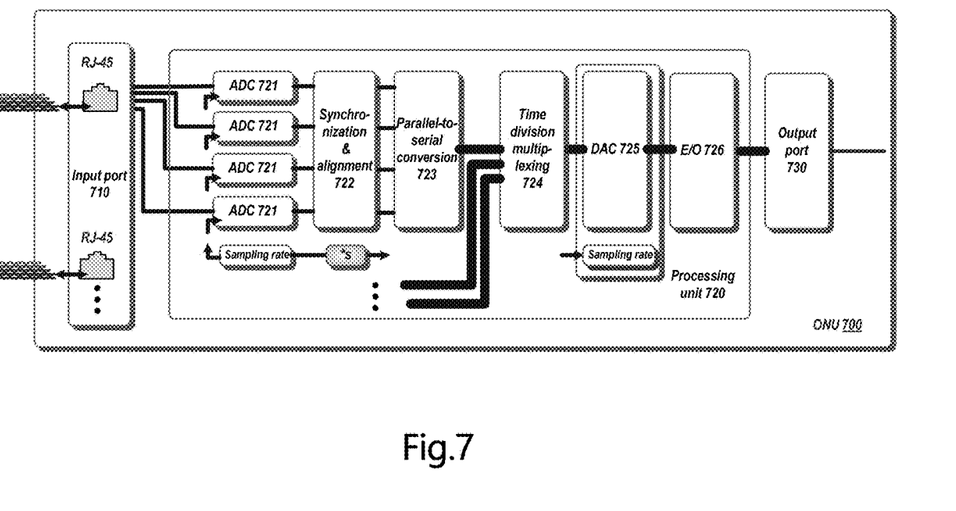
FIG. 7 illustrates a schematic block diagram of an optical network unit (ONU) according to an embodiment of the present disclosure.

FIG. 7 illustrates a schematic block diagram of an ONU 700 according to an embodiment of the present disclosure. As shown in FIG. 7, in some embodiments, the ONU 700 may include: an input port 710, a processing unit 720 and an output port 730. In some embodiments, the input port 710 can be configured to receive signals via a twisted pair. The processing unit 720 can be configured to process the received signals. The output port 730 can be configured to output the processed signals to the PON architecture for transport.

As further illustrated in FIG. 7, in some embodiments, the input port 710 may include a RJ-45 port and the output port 730 may include a small pluggable interface (SFP). In some embodiments, the processing unit 720 may include one or more of the following units: an ADC unit 721, a synchronizing and aligning unit 722, a parallel-to-serial converting unit 723, a time division multiplexing unit 724, a DAC unit 725, and an electrical-to-optical converting E/O unit 726. The specific working principle and operation process of these units are well known to those skilled in the art, and thus omitted here.

In the specific embodiment depicted in FIG. 7, four outputs of previous RRH module can be connected to ONU 700 via a twisted pair. Those skilled in the art can understand that the RRH module according to the embodiments of the present disclosure can also have more or less outputs, and the present disclosure is not limited in this regard. During processing and transporting of signals, a sample bandwidth and a sampling rate of an ADC 721 in the ONU 700 may correspond to the radio bandwidth. The acquired and quantized data streams of the four outputs from the ADC 721 are firstly synchronized and aligned. Then, the four parallel data streams are reshaped as serial and multiplexed in time domain according to a post BBU-assigned time slot allocation. The newly generated and encapsulated data stream is converted into analog signals and then modulated onto optical signals for transport over an optical fiber. As illustrated in FIG. 7, the sampling rate of a DAC 725 is s times as large as that of the ADC 721, for example, 4 times as large as the sampling rate of the ADC 721. When a future system upgrading is considered, "s" can be reconfigurable according to software defined requirement from the BBU.

It is noteworthy that the synchronizing and aligning unit 722 of the ONU 700 only functions to correct the propagation time difference caused among four ADC 721 channels. Any delay or time difference caused in transport via wireless links or twisted pairs is not processed in the synchronizing and aligning unit 722. It is noteworthy that the four signal inputs from twisted pair ports have analog characteristics and so do the output signals on the optical fiber.

Figure 8:
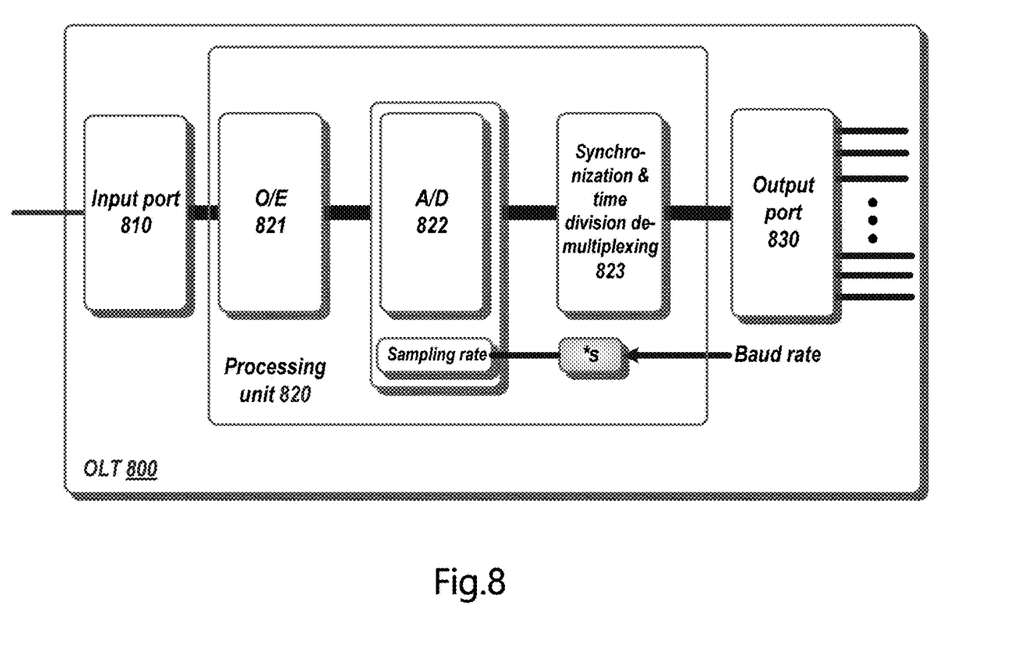
FIG. 8 illustrates a schematic block diagram of an optical line terminal (OLT) according to an embodiment of the present disclosure.

FIG. 8 illustrates a schematic block diagram of an OLT 800 according to an embodiment of the present disclosure. As illustrated in FIG. 8, the OLT 800 may include: an input port 810, a processing unit 820 and an output port 830. In some embodiments, the input port 810 can be configured to receive an optical signal via an optical fiber and PON architecture, wherein the optical signal is generated based on the signals transported via a twisted pair. In some specific embodiments, the input port 810 may include a SFP. In some embodiments, the processing unit 820 can be configured to process the received optical signals as electrical signals. In some embodiments, the output port 830 can be configured to output the processed electrical signals.

As further shown in FIG. 8, in some embodiments, the processing unit 820 may include one or more of the following units: an optical-to-electrical converting O/E unit 821, an analog-digital converting A/D unit 822, and a synchronizing and time division multiplexing unit 823. The specific working principle and operation process of these units are well known to those skilled in the art, and thus omitted here.

In some embodiments, an incoming signal entering the OLT 800 may have gone through the optical fiber for, for instance, 20 km. An optical-to-electrical conversion may be firstly performed on the incoming signal in the OLT 800, and then an analog serial data stream may be quantized by A/D 822 whose sample bandwidth and sampling rate should match the overall capacity carried on the optical fiber. "s" times denoted in FIG. 8 is the sampling rate of the A/D 822 with respect to the base baud rate. The output of the A/D 822 may be buffered in a memory and be synchronized, and may finally be de-multiplexed according to a dynamic bandwidth allocation (DBA), wherein the number of parallel data streams may be determined by the overall channel numbers carried on the optical fiber.

Now, referring back to FIG. 3 to further illustrate BBU 350, as shown in FIG. 3, the BBU 350 includes a compensating unit 351. In some embodiments, a compensating unit 351 can be configured to compensate for crosstalk of signals during transmission via the twisted pair. In the embodiment using wireless MIMO, the compensating unit 351 can be further configured to compensate for crosstalk of signals during transmission via the twisted pair and interference during MIMO transmission simultaneously. In some embodiments, the BBU 350 may further include a decoding unit 352 which can be configured to decode incoming signals. Its specific working principle and operation process are well known to those skilled in the art, and thus omitted here.

With the processing of previous stages of the RRH, the ONU and the OLT, now the signals entering the BBU 350 are almost the same as that used for an input of a conventional BBU for an uplink. The difference only lies in that signals of each channel are not only transported via an wireless MIMO channel but also experience inter-channel crosstalk of a twisted pair, and thus a channelization similar to MIMO may also be used. In a specific embodiment, a MIMO detector for wireless decoding in the BBU 350 can compensate for wireless MIMO channels and crosstalk effect of twisted pairs simultaneously.

Figure 9:
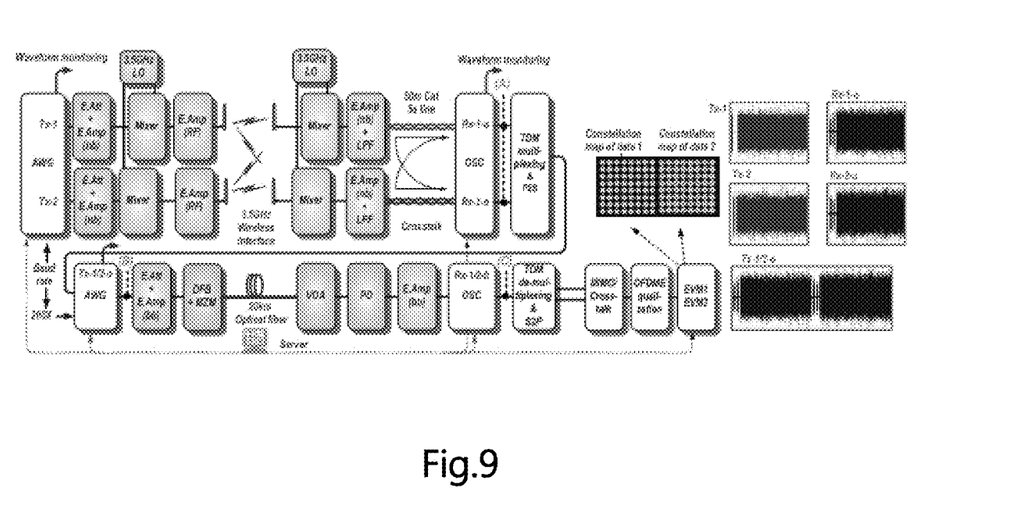
FIG. 9 illustrates a schematic block diagram of a specific exemplary wireless access system according to an embodiment of the present disclosure.

FIG. 9 illustrates a schematic block diagram of a specific exemplary wireless access system according to an embodiment of the present disclosure. In the detailed embodiment shown in FIG. 9, an application scenario example using 2×2 wireless MIMO, a twisted pair of 50 meters (2×2 crosstalk) and an optical fiber of 20 km is shown. In this embodiment, the overall uplink transporting process can be divided into two parts, namely, narrow band transporting via a wireless link and a twisted pair and broadband transporting via an optical fiber. In FIG. 9, AWG represents an arbitrary waveform generator (D/A), TX represents a transmitter, E stands for the electrical domain, O represents the optical domain, Ant means an antenna, Att stands for an attenuator, Amp represents an amplifier, LO represents an oscillator, bb stands for broadband, nb means narrowband, P2S means a parallel-to-serial conversion, 250× stands for 250 times, DFB represents a distributed feedback laser, MZM stands for Mach-Zehnder modulator, VOA means a variable optical attenuator, PD means a photodetector, OSC means an oscilloscope (A/D), MIMO stands for multiple input multiple output, and EVM means an error vector magnitude.

FIG. 9 further illustrates a specific module configuration. During signal transporting process, two individual data, namely, Data-1 and Data-2 are in 1024FFT 64QAM format with 20 Hz bandwidth, compatible to 4G LTE data format. Data-1 and Data-2 are firstly generated by an arbitrary waveform generator (AWG) and then up converted to 3.5 GHz RF frequency band and sent by two individual antennas, representing multiple wireless users. Two antennas working on the same RF band may be used as an RF MIMO receiver. The two signals are individually converted to DC to 20 MHz in baseband. With proper power, the two signals then enter two twisted pairs in a common Cat 5a line of 50 meters. At the other end of the twisted pairs, the two signals are separately captured by the real-time oscilloscope using two channels simultaneously.

Next, the two received signals captured in the real time oscilloscope are converted from parallel to serial, with one data stream aligned in front of the other. In other words, a time domain multiplexing scheme is employed. The newly generated stream may be uploaded into the AWG again. This time the AWG may operate at a 5G sampling rate, which is 250 times as large as 20 MHz, indicating that the two signals occupy a $\frac{1}{125}$ time slot of the overall broadband signal on the optical fiber link. A 20 km standard single mode optical fiber may be used as a long reach media between an ONU and a BBU. The real time oscilloscope may again be used to capture the broadband signal after optical fiber transmission and the optical/electrical conversion. The serial data stream may firstly be split into two parallel data streams and may be decoded according to unified channelization information learned from training data. The recovered constellations are shown in FIG. 9 as well.

As the specific example in FIG. 9 indicates, on the one hand, recovery of a hybrid channel (a MIMO wireless link+a crosstalk rich twisted pair) is achievable at BBU side for uplink. On the other hand, large capacity (say, over 200 channels) transport over an optical fiber can be supported using economically available optical components and devices.

In the embodiments of the present disclosure, a massive-capacity transport solution is proposed for indoor wireless access over a hybrid MIMO wireless channel and fixed network architecture consisting of a crosstalk rich unshielded twisted pair and a long reach optical fiber. The similarity between crosstalk rich channelization of the twisted pair and interference rich channelization of MIMO over wireless interface has been fully utilized. The overall crosstalk mitigation and pre-coding algorithms are carried out in post BBU pool after the hybrid transport with sustaining DSP complexity of conventional BBU. Economical Cat 5a/6a lines are fully utilized for the last 100 meter access in building to significantly reduce the indoor wireless fronthaul installation and deployment cost. MIMO application is also compatible in this approach, comparing to conventional indoor DAS solutions. By converging and multiplexing the data streams in an ONU and then transporting overall broadband signals over optical fiber from the ONU to the BBU, large fronthaul capacity can be realized, showing great capacity superiority over current CPRI protocol. Therefore, the technical solution according to the embodiments of the present disclosure is very promising for next generation wireless access (especially for indoor application and deployment).

In the description of the embodiments of the present disclosure, the terms used herein, such as "comprising" and "including", should be interpreted as inclusive terms, namely, "comprising/including but not limited to". The term "based on" means "at least partly based on". The term "one embodiment" or "the embodiment" should be interpreted as "at least one embodiment".

It should be noted that embodiments of the present disclosure can be implemented with software, hardware or the combination thereof. The hardware part can be implemented by a special logic; the software part can be stored in a memory and executed by a proper instruction execution system such as a microprocessor or a design-specific hardware. The normally skilled in the art may understand that the above device and method may be implemented with a computer-executable instruction and/or in a processor controlled code, for example, such code is provided on a bearer medium such as a programmable memory or a data bearer such as an optical or electronic signal bearer.

Beside, although operations of the present methods are described in a particular order in the drawings, it does not require or imply that these operations must be performed according to this particular sequence, or a desired outcome can only be achieved by performing all shown operations. On the contrary, the execution order for the steps as described in the flowcharts may be varied. Additionally or alternatively, some steps may be omitted, a plurality of steps may be merged into one step, or a step may be divided into a plurality of steps for execution. It should also be noted that the features and functions of the above described two or more units may be embodied in one means. In turn, the features and functions of the above described one means may be further embodied in more units.

Although the present disclosure has been described with reference to a plurality of embodiments, it should be understood that the present disclosure is not limited to the disclosed embodiments. The present disclosure intends to cover various modifications and equivalent arrangements included in the spirit and scope of the appended claims.

We claim:

1. A wireless access system, comprising:
    a baseband processing unit (BBU) pool,
    an optical network unit (ONU), and
    a set of remote radio heads, the BBU pool being connected to one or more ONUs, each of the ONUs being connected to at least two remote radio heads of the set of remote radio heads, a connection between each of the ONUs and each of the at least two remote radio heads being implemented using a twisted pair,
    wherein the BBU pool compensates for crosstalk in transmission via the twisted pair.

2. The wireless access system according to claim 1, wherein the connection between each of the ONUs and each of the set of remote radio heads is implemented using a RJ-45 port.

3. The wireless access system according to claim 1, wherein the connection between the BBU pool and the one or more ONUs is implemented using optical fiber and passive optical network (PON) architecture.

4. The wireless access system according to claim 1, wherein each of the set of remote radio heads enables coordinated transmission of one or more antennas.

5. The wireless access system according to claim 4, wherein the coordinated transmission includes multiple-input multiple-output (MIMO) transmission.

6. The wireless access system according to claim 5, wherein the BBU pool compensates for crosstalk in transmission via the twisted pair and interference in the MIMO transmission simultaneously.

7. The wireless access system according to claim 4, wherein the coordinated transmission includes coordinated multiple-point (CoMP) transmission.

8. The wireless access system according to claim 1, wherein each of the at least two remote radio heads separately receive signals from respective ones of a plurality of antennas, separately perform the following:
    process the received signals, and
    feed the processed signals to respective ones of twisted pairs that correspond to the plurality of antennas to transport the signals to the connected ONUs in parallel.

9. The wireless access system according to claim 1, wherein each of the remote radio heads and the ONU are located inside a building and the twisted pair includes a local area network (LAN) cable and/or a phone line cable.

* * * * *